(12) United States Patent
Topoulos

(10) Patent No.: US 8,859,665 B2
(45) Date of Patent: *Oct. 14, 2014

(54) POLYAMIDE HOUSINGS FOR PORTABLE ELECTRONIC DEVICES

(75) Inventor: Georgios Topoulos, Geneva (CH)

(73) Assignee: E I du Pont de Nemours and Company, Wilmington, DE (US)

( * ) Notice: Subject to any disclaimer, the term of this patent is extended or adjusted under 35 U.S.C. 154(b) by 985 days.

This patent is subject to a terminal disclaimer.

(21) Appl. No.: 11/985,430

(22) Filed: Nov. 15, 2007

(65) Prior Publication Data

US 2008/0132633 A1 Jun. 5, 2008

Related U.S. Application Data

(60) Provisional application No. 60/873,227, filed on Dec. 5, 2006.

(51) Int. Cl.
*C08K 3/00* (2006.01)
*C08K 7/14* (2006.01)
*C08J 5/04* (2006.01)

(52) U.S. Cl.
CPC .............. *C08J 5/044* (2013.01); *C08J 2377/00* (2013.01); *C08K 7/14* (2013.01); *C08J 5/043* (2013.01)
USPC ........... 524/447; 524/445; 524/456; 524/502; 524/606

(58) Field of Classification Search
CPC ..... C08L 77/06; C08L 2666/20; C08L 77/00; C08L 77/02; C08L 2205/16; C08L 2205/02; C08L 2205/03; C08L 77/10; C08K 7/14; C08K 3/40; C08G 69/26; C08G 69/265; C08G 69/14; C08J 5/043; C08J 5/044
USPC .................. 264/540; 428/220, 504; 523/200; 524/147, 404, 430, 431, 445, 446, 447, 524/497, 514, 601, 606, 612, 456, 502; 525/100; 528/310

See application file for complete search history.

(56) References Cited

U.S. PATENT DOCUMENTS

| 3,264,272 A | 8/1966 | Rees |
| 4,187,358 A | 2/1980 | Kyo |
| 6,319,986 B1 * | 11/2001 | Amimoto et al. ............... 525/66 |
| 6,812,275 B1 * | 11/2004 | Tai ................................ 524/495 |
| 2001/0003766 A1 * | 6/2001 | Nozaki ........................... 525/66 |

FOREIGN PATENT DOCUMENTS

| EP | 0 190 001 | 8/1986 |
| EP | 0 196 194 | 10/1986 |
| EP | 0 246 620 | 11/1987 |

OTHER PUBLICATIONS

Japan Abstract, JP 2004 168849, Fujitsu Ltd.

* cited by examiner

*Primary Examiner* — Ling Choi
*Assistant Examiner* — Chun-Cheng Wang

(57) ABSTRACT

Portable electronic device housings comprising polyamide compositions comprising fibrous reinforcing agents having non-circular cross sections.

18 Claims, 2 Drawing Sheets

POLYAMIDE HOUSINGS FOR PORTABLE ELECTRONIC DEVICES

CROSS REFERENCE TO RELATED APPLICATIONS

This application claims the benefit of priority to U.S. Provisional Application No. 60/873,227, filed Dec. 5, 2006.

FIELD OF THE INVENTION

The present invention relates to portable electronic device housings comprising a polyamide composition having excellent stiffness and impact resistance and low anisotropic shrinkage on molding.

BACKGROUND OF THE INVENTION

Portable electronic devices, such as mobile telephones, personal digital assistants, laptop computers, tablet computers, global positioning system receivers, portable games, radios, cameras and camera accessories, and the like are becoming increasingly widely used globally in many different environments. It is often important that the housings of such devices be made from materials that are able to withstand the rigors of frequent use and can meet challenging aesthetic demands while not interfering with their intended operability. It is often desirable that such materials have good stiffness and impact resistance and that they exhibit minimal shrinkage (i.e., low warpage or high dimensional stability) when they are formed (as by injection molding, for example) into housings.

Thermoplastic polyamide compositions are desirable for use in making housings for portable electronic devices because of their good physical properties and that they may be conveniently and flexibly molded into a variety of articles of varying degrees of complexity and intricacy. Reinforcing agents are typically added to polyamide compositions to increase stiffness, but can often result in compositions that exhibit undesirable degrees of anisotropic shrinkage up on molding. It would thus be desirable to obtain housings for portable electronic devices that are made from polyamide compositions having excellent stiffness and impact resistance and low anisotropic warpage (i.e., good dimensional stability). By "warpage" is meant the deformation of molded parts in one or more directions that may be caused by anisotropic shrinkage of the resin during molding.

EP 0 190 001 discloses a flat glass fiber strand comprising a multiplicity of glass filaments having an oblong, elliptical, or rectangular cross-sectional shape. EP 0 196 194 discloses a strand comprising glass fibers having at least two expanded apex portions and a recess. EP 0 246 620 discloses a glass-fiber reinforced resin molded article that comprises a thermoplastic resin reinforced with glass fibers having oblong, elliptical, or cocoon-shaped cross sections. EP 0 376 616 discloses a thermoplastic resin composition reinforced with a fibrous reinforcing agent having a non-circular cross section.

SUMMARY OF THE INVENTION

There is disclosed and claimed herein a portable electronic device housing comprising a polyamide composition comprising a melt-mixed blend of (A) at least one thermoplastic polyamide and (B) at least one fibrous reinforcing agent having a non-circular cross section.

DETAILED DESCRIPTION OF THE INVENTION

Figure 1:
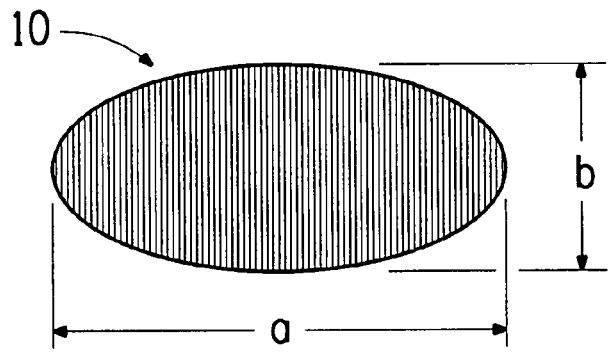
FIG. 1 is a cross-sectional view of a fibrous reinforcing agent having a non-circular cross section where the cross section has a major axis and a minor axis.

By "portable electronic device" is meant an electronic device that is designed to be conveniently transported and used in various locations. Representative examples of portable electronic devices include mobile telephones, personal digital assistants, laptop computers, tablet computers, radios, cameras and camera accessories, watches, calculators, music players, global positioning system receivers, portable games, hard drives and other electronic storage devices, and the like.

By "portable electronic device housing" is meant a cover, backbone, or the like of the device. The housing may be a single article or comprise two or more components. By "backbone" is meant a structural component onto which other components of the device, such as electronics, microprocessors, screens, keyboards and keypads, antennas, battery sockets, and the like are mounted. The backbone may be an interior component that is not visible or only partially visible from the exterior of the telephone. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas.

In a preferred embodiment, the housings of the present invention are mobile telephone housings. By "mobile telephone housing" is meant one or more of the back cover, front cover, antenna housing, and/or backbone of a mobile phone. The housing may be a single article incorporating one or more of the foregoing. By "backbone" is meant a structural component onto which other components of the mobile telephone, such as electronics, screens, battery sockets, and the like are mounted. The backbone may be an interior component that is not visible or only partially visible from the exterior of the telephone.

The housing of the present invention comprises a composition comprising a melt-mixed blend of (A) at least one thermoplastic polyamide and (B) at least one fibrous reinforcing agent having a non-circular cross section.

Thermoplastic polyamide (A) is at least one polyamide. Suitable polyamides can be condensation products of one or more dicarboxylic acids and one or more diamines, and/or one or more aminocarboxylic acids, and/or ring-opening polymerization products of one or more cyclic lactams.

Suitable dicarboxylic acids include, but are not limited to, adipic acid, azelaic acid, terephthalic acid (abbreviated as "T" in polyamide designations), and isophthalic acid (abbreviated as "I" in polyamide designations). Preferred are dicarboxylic acids having 10 or more carbon atoms, including, but not limited to sebacic acid; dodecanedioic acid, tetradecanedioic acid, pentadecanedioic acid, and the like.

Suitable diamines include, but are not limited to, tetramethylenediamine; hexamethylenediamine; octamethylenediamine; nonamethylenediamine; 2-methylpentamethylenediamine; 2-methyloctamethylenediamine; trimethylhexamethylenediamine; bis(p-aminocyclohexyl) methane; m-xylylenediamine; and p-xylylenediamine. Preferred diamines have 10 or more carbon atoms, including, but not limited to decamethylenediamine; undecamethylenediamine; dodecamethylenediamine; tridecamethylenediamine; tetramethylenediamine; pentamethylenediamine; hexamethylenediamine; and the like.

A suitable aminocarboxylic acid is 11-aminododecanoic acid. Suitable cyclic lactams are caprolactam and laurolactam.

Preferred polyamides include aliphatic polyamides such as polyamide 6; polyamide 6,6; polyamide 4,6; polyamide 6,10; polyamide 6,12; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; polyamide 6,13; and semi-aromatic polyamides such as poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T); hexamethylene adipamide/hexamethylene terephthalamide/hexamethylene isophthalamide copolyamide (polyamide 6,6/6,T/6,I); poly(caprolactam-hexamethylene terephthalamide) (polyamide 6/6,T); and copolymers and mixtures of these polymers.

The polyamides may be amorphous polyamides or semicrystalline. An example of a suitable amorphous polyamide includes hexamethylene terephthalamide/hexamethylene isophthalamide (6,T/6,I) copolymer.

Polyamide (A) is preferably present in the composition in about 25 to about 85 weight percent, or more preferably in about 30 to about 75 weight percent, or yet more preferably in about 35 to about 65 weight percent, or still more preferably in about 40 to about 55 weight percent, based on the total weight of the composition.

Figure 2A:
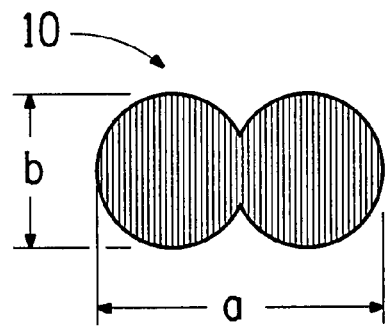
FIG. 2A is a cross-sectional view of a fibrous reinforcing agent having a cocoon-type non-circular cross section.
Figure 2B:
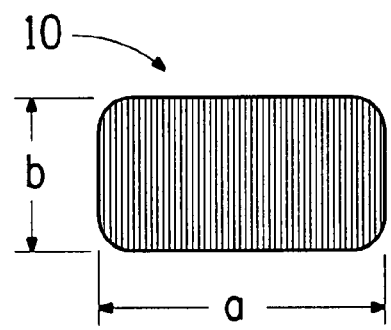
FIG. 2B is a cross-sectional view of a fibrous reinforcing agent having a rectangular non-circular cross section.
Figure 2C:
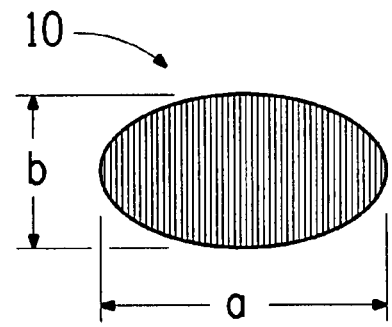
FIG. 2C is a cross-sectional view of a fibrous reinforcing agent having an elliptical non-circular cross section.
Figure 2D:
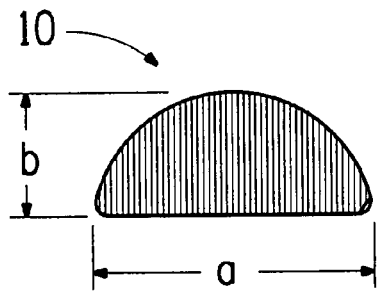
FIG. 2D is a cross-sectional view of a fibrous reinforcing agent having a semielliptical non-circular cross section.
Figure 2E:
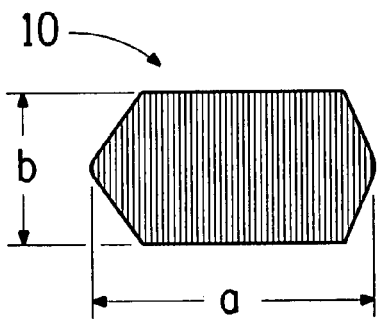
FIG. 2E is a cross-sectional view of a fibrous reinforcing agent having a roughly triangular non-circular cross section.
Figure 2F:
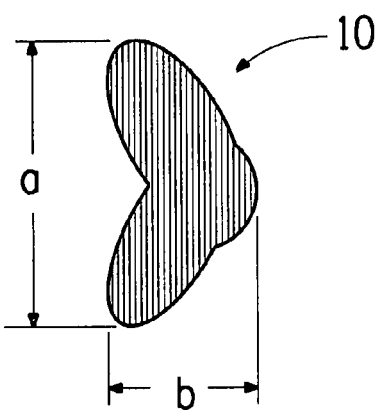
FIG. 2F is a cross-sectional view of a fibrous reinforcing agent having a polygonal non-circular cross section.
Figure 2G:
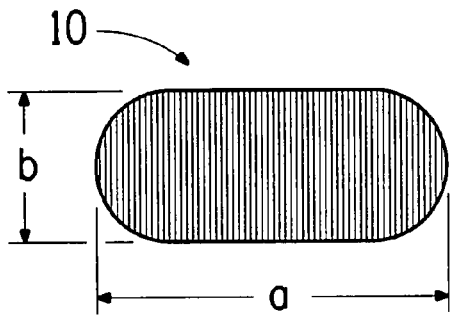
FIG. 2G is a cross-sectional view of a fibrous reinforcing agent having an oblong non-circular cross section.

Fibrous reinforcing agent (B) has a non-circular cross section having a major axis lying perpendicular to a longitudinal direction of the reinforcing agent and corresponding to the longest linear distance in the cross section. The non-circular cross section has a minor axis corresponding to the longest linear distance in the cross section in a direction perpendicular to the major axis. FIG. 1 shows a representative non-circular cross sectional view of a fiber 10 having a major axis a and a minor axis b. The non-circular cross section of the fiber 10 may have a variety of shapes. Representative shapes of the non-circular cross section of the fiber 10 are shown in FIG. 2, wherein the cross sections each have a major axis a and a minor axis b FIG. 2A shows a cocoon-type (figure-eight) shape; FIG. 2B shows a rectangular shape; FIG. 2C shows an elliptical shape; FIG. 2D shows a semielliptical shape; FIG. 2E shows a roughly triangular shape FIG. 2F shows a polygonal shape; and FIG. 2B shows an oblong shape. As will be understood by those skilled in the art, the cross section may have other shapes.

The ratio of the length of the major axis to that of the minor access is preferably between about 1.5:1 and about 6:1. The ratio is more preferably between about 2:1 and 5:1 and yet more preferably between about 3:1 to about 4:1.

The fibrous reinforcing agent may be glass, carbon fibers, or other materials. Glass fibers are preferred. Suitable glass fibrous reinforcing agents are disclosed in EP 0 190 001 and EP 0 196 194.

The fibrous reinforcing agent may be in the form of long glass fibers, chopped strands, milled short glass fibers, or other suitable forms known to those skilled in the art.

Fibrous reinforcing agent (B) is preferably present in the composition in about 15 to about 75 weight percent, or more preferably in about 25 to about 70 weight percent, or yet more preferably in about 35 to about 65 weight percent, or still more preferably in about 45 to about 60 weight percent based on the total weight of the composition.

The composition may optionally further comprise an impact modifier (C). Preferred impact modifiers include those typically used for polyamides, including carboxyl-substituted polyolefins, which are polyolefins that have carboxylic moieties attached thereto, either on the polyolefin backbone itself or on side chains. By "carboxylic moieties" is meant carboxylic groups such as one or more of dicarboxylic acids, diesters, dicarboxylic monoesters, acid anhydrides, and monocarboxylic acids and esters. Useful impact modifiers include dicarboxyl-substituted polyolefins, which are polyolefins that have dicarboxylic moieties attached thereto, either on the polyolefin backbone itself or on side chains. By 'dicarboxylic moiety' is meant dicarboxylic groups such as one or more of dicarboxylic acids, diesters, dicarboxylic monoesters, and acid anhydrides.

The impact modifier may preferably be based on an ethylene/α-olefin polyolefin. Diene monomers such as 1,4-butadiene; 1,4-hexadiene; or dicyclopentadiene may optionally be used in the preparation of the polyolefin. Preferred polyolefins include ethylene-propylene-diene (EPDM) polymers made from 1,4-hexadiene and/or dicyclopentadiene and styrene-ethylene-butadiene-styrene (SEBS) polymers. As will be understood by those skilled in the art, the impact modifier may or may not have one or more carboxyl moieties attached thereto.

The carboxyl moiety may be introduced during the preparation of the polyolefin by copolymerizing with an unsaturated carboxyl-containing monomer. Preferred is a copolymer of ethylene and maleic anhydride monoethyl ester. The carboxyl moiety may also be introduced by grafting the polyolefin with an unsaturated compound containing a carboxyl moiety, such as an acid, ester, diacid, diester, acid ester, or anhydride. A preferred grafting agent is maleic anhydride. A preferred impact modifier is an EPDM polymer grafted with maleic anhydride, such as Fusabond® N MF521D, which is commercially available from E. I. DuPont de Nemours & Co., Inc., Wilmington, Del. Blends of polyolefins, such as polyethylene, polypropylene, and EPDM polymers with polyolefins that have been grafted with an unsaturated compound containing a carboxyl moiety may be used as an impact modifier.

Suitable impact modifiers may also include ionomers. By an ionomer is meant a carboxyl group containing polymer that has been neutralized or partially neutralized with metal cations such as zinc, sodium, or lithium and the like.

Examples of ionomers are described in U.S. Pat. Nos. 3,264, 272 and 4,187,358, both incorporated by reference herein. Examples of suitable carboxyl group containing polymers include, but are not limited to, ethylene/acrylic acid copolymers and ethylene/methacrylic acid copolymers. The carboxyl group containing polymers may also be derived from one or more additional monomers, such as, but not limited to, butyl acrylate. Zinc salts are preferred neutralizing agents. Ionomers are commercially available under the Surlyn® trademark from E.I. du Pont de Nemours and Co., Wilmington, Del.

Impact modifier (C) is present in the composition in 0 to about 20 weight percent, or preferably in about 3 to about 20 weight percent, or more preferably in about 5 to about 15 weight percent, based on the total weight of the composition.

The compositions used in the present invention may optionally contain additional reinforcing agents such as fibrous reinforcing agents having a circular cross section or flakey or particulate reinforcing agents. The addition reinforcing agents may include mineral reinforcing agents. Examples include glass fibers having a circular cross section, glass flakes, carbon fibers, wollastonite, calcined clay, kaolin, and the like.

The compositions used in the present invention may optionally comprise additional additives such as ultraviolet light stabilizers, heat stabilizers, antioxidants, processing aids, lubricants, flame retardants, and/or colorants (including dyes, pigments, carbon black, and the like).

The compositions used in the present invention preferably have a tensile modulus that is at least about 10 GPa, or preferably at least about 12 GPa, or more preferably at least about 14 GPa or yet more preferably at least 15 GPa. Tensile modulus is determined according to the ISO 527-1/2 method. Test specimens are elongated at a constant rate of 1 mm/min. The tensile modulus E is determined using Young's law by measuring the forces F1 and F2 needed to elongate test specimens to 0.05 percent (e1) and 0.25 percent (e2):

$$E=(F2-F1)/(S*(e2-e1))$$

where S is the cross section (transversal section) of the test specimen.

The test specimens used are tensile type 1B with a radius r of 60 mm, which are described into the ISO procedure and obtained by injection molding. Test specimens are placed into sealed bags immediately after molding until testing in order to prevent moisture pick up. Tensile modulus is measured for 8 specimens for each polymer and the results is the average of them. Cross section S is determined for each sample by measuring its thickness and its breadth.

The compositions used in the present invention preferably have notched Charpy impact strength of at least about 7 kJ/m$^2$, or more preferable of at least about 10 kJ/m$^2$, or yet more preferably of about 12 kJ/m$^2$ or still more preferable of about 12 kJ/m$^2$. Notched Charpy impact strength is measured according to ISO 179 using test specimens prepared according to ISO 179-1/1eA. The energy E necessary to break the specimen is measure and Charpy impact strength is calculated by dividing the energy E by the cross-sectional area of the specimen. The impact strength is average of the results from testing 10 specimens.

The compositions used in the present invention preferably have a warpage of less than about 0.45, or more preferably of less than about 0.40, or yet more preferably of less than about 0.35. Warpage is determined as follows: Compositions are injection molded into plaques having dimension of 60×60×2 mm according to ISO 29 4-3. Following molding and cooling, the widths of the plaques in the flow and cross-flow directions were measured. The flow direction is defined by the direction into which the molten resin was injected into the mold and the cross-flow direction is perpendicular across the surface of the plaque relative to the flow direction. The percentage by which the plaques had shrunken in each direction was calculated relative to the mold dimensions. The warpage is the absolute value of the percent shrinkage in the cross-flow direction minus the percent shrinkage in the flow direction.

The compositions used in the present invention are made by melt-blending the components using any known methods. The component materials may be mixed to uniformity using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed until uniform.

The housings for portable electronic devices are made from the compositions using any suitable melt-processing method. Injection molding is a preferred method.

EXAMPLES

The compositions of the Examples (abbreviated as "Ex." In the tables) and Comparative Examples (abbreviated as "CE" in the tables were prepared by melt-compounding the ingredients shown in Table 1 in a twin-screw extruder.

The material used in Comparative Example 3 is Zytel® HTN 53G50 HFLR, a polyamide 6,I/6,T-polyamide 6,6 blend supplied by E.I. du Pont de Nemours & Co., Wilmington, Del., which was injection molded into test specimens.

Tensile properties (tensile modulus, stress at break, and strain at break) were measured according to ISO 157-1/2 at 23° C. on samples that were dry as molded.

Impact properties (unnotched Charpy and notched Charpy impact strengths) were measured according to ISO 179/1eA at 23° C. on samples that were dry as molded.

Warpage properties were measured as described above under the Detailed Description of the Invention.

Surface appearance was assessed by visually inspecting the flat surfaces of injection molded test specimens. Surfaces having a relatively rough appearance caused by the presence of glass fibers were deemed to be "poor," while surfaces having a relatively smooth appearance were deemed to be "good"

The following ingredients are referred to in Table 1:
Circular glass fibers refers to refers to E-glass fibers having a number average diameter of about 10 microns and a circular cross section.
Glass fibers A refers to CSG3PA820, glass fibers having a non-circular cross section supplied by Nitto Boseki Co. Ltd. (Nittobo) Tokyo, Japan.
Glass fibers B refers to CSG3PA830, glass fibers having a non-circular cross section supplied by Nitto Boseki Co. Ltd. (Nittobo) Tokyo, Japan
Impact modifier refers to ethylene/propylene/diene copolymers partially grafted with maleic anhydride.
Color concentrate A refers to a master batch containing about 30 weight percent carbon black in polyamide 6.
Color concentrate B refers to a master batch containing about 40 weigh percent of a blue pigment in polyamide 6
Process aids refers to calcium montanate.

TABLE 1

|  | Ex. 1 | Ex. 2 | Ex. 3 | Ex. 4 | Ex. 5 | Ex. 6 | Ex. 7 | Ex. 8 | CE 1 | CE 2 |
|---|---|---|---|---|---|---|---|---|---|---|
| Polyamide 10,10 | — | — | — | — | — | 47.9 | 47.9 | 37.9 | 46 | 36 |
| Polyamide 6,6 | 32.9 | 25.9 | 32.9 | 29 | 30 | — | — | — | — | — |
| Polyamide 6,I/6,T | 15 | 12 | 15 | 11 | 11 | — | — | — | — | — |
| Circular glass fibers | — | — | — | 19 | — | — | — | — | 50 | 60 |
| Glass fibers A | 50 | 60 | — | 27 | 50 | — | 50 | 60 | — | — |
| Glass fibers B | — | — | 50 | — | — | 50 | — | — | — | — |
| Impact modifier | — | — | — | 10 | 5 | — | — | — | — | — |
| Antioxidants | 0.6 | 0.6 | 0.6 | 0.7 | 0.7 | 0.6 | 0.6 | 0.6 | 0.7 | 0.7 |
| Process aids | 0.3 | 0.3 | 0.3 | 0.3 | 0.3 | 0.3 | 0.3 | 0.3 | 0.3 | 0.3 |
| Color concentrate A | 1.2 | 1.2 | 1.2 | — | — | 1.2 | 1.2 | 1.2 | — | — |
| Color concentrate B | — | — | — | 3 | 3 | — | — | — | 3 | 3 |

Ingredient quantities are given in weight percentages based on the total weight of the composition.

TABLE 2

|  | Ex. 1 | Ex. 2 | Ex. 3 | Ex. 4 | Ex. 5 | Ex. 6 | Ex. 7 | Ex. 8 | CE 1 | CE 2 | CE 3 |
|---|---|---|---|---|---|---|---|---|---|---|---|
| Tensile modulus (GPa) | 17.2 | 21.2 | 17.3 | 11 | 14 | 14.3 | 14.1 | 18.1 | 15.1 | 18 In mtl. 6 | 17 |
| Elongation at break (%) | 2.1 | 1.8 | 1.6 | 2.1 | 1.5 | 2.6 | 2.7 | 2.4 | 2.8 | 2.5 | 2.7 |
| Notched Charpy impact strength (kJ/m$^2$) | 14.7 | 13.6 | 11.6 | 14.1 | 8.9 | 19.5 | 19.3 | 20.1 | 11.9 | 10.5 | 12.9 |
| Unnotched Charpy impact strength (kJ/m$^2$) | 70.1 | 61.2 | 53.8 | 41.5 | 31.2 | 89.8 | 93.8 | 89.4 | 84.9 | 64.9 | 96.8 |
| Mold shrinkage: |  |  |  |  |  |  |  |  |  |  |  |
| Flow direction (%) | 0.08 | 0.09 | 0.11 | — | — | 0.13 | 0.13 | 0.12 | 0.01 | 0.03 | 0.15 |
| Cross-flow direction (%) | 0.25 | 0.29 | 0.33 | — | — | 0.39 | 0.39 | 0.36 | 0.49 | 0.39 | 0.65 |
| Warpage | 0.17 | 0.2 | 0.22 | — | — | 0.26 | 0.26 | 0.24 | 0.48 | 0.36 | 0.5 |
| Surface appearance | good | good | good | good | good | good | good | good | good | poor | good |

What is claimed is:

1. A molded portable electronic device housing comprising a polyamide composition comprising a melt-mixed blend of (A) at least one thermoplastic polyamide and (B) at least one fibrous reinforcing agent having a non-circular cross section, wherein said at least one fibrous reinforcing agent comprises glass fiber; wherein said thermoplastic polyamide consist essentially of a polyamide selected from the group consisting of polyamide 10,10; polyamide 10,12; polyamide 10,13; polyamide 10,14; polyamide 12,10; polyamide 12,12; polyamide 12,13; and polyamide 12,14; said polyamide composition has a Notched Charpy impact strength of at least 12 kJ/m$^2$, measured according to ISO 179 using test specimens prepared according to ISO 179-1/1eA; and said portable electronic device housing having a warpage of less than about 0.45, wherein the warpage is the absolute value of the percent shrinkage of said portable electronic device housing in a cross-flow direction minus the percent shrinkage in a flow direction upon molding.

2. The housing of claim 1, wherein the thermoplastic polyamide (A) comprises about 25 to about 85 weight percent of the polyamide composition.

3. The housing of claim 1, wherein the thermoplastic polyamide (A) comprises about 30 to about 75 weight percent of the polyamide composition.

4. The housing of claim 1, wherein the fibrous reinforcing agent (B) comprises about 15 to about 75 weight percent of the polyamide composition.

5. The housing of claim 1, wherein the fibrous reinforcing agent (B) comprises about 25 to about 70 weight percent of the polyamide composition.

6. The housing of claim 1, wherein the fibrous reinforcing agent (B) has a cocoon-type cross-section.

7. The housing of claim 1, wherein the fibrous reinforcing agent (B) has a rectangular cross-section.

8. The housing of claim 1, wherein the fibrous reinforcing agent (B) has an elliptical cross-section.

9. The housing of claim 1, wherein the polyamide composition further comprises up to about 20 weight percent of at least one impact modifier.

10. The housing of claim 9, wherein the impact modifier is present in about 3 to about 20 weight percent, based on the total weight of the composition.

11. The housing of claim 9 wherein the impact modifier is an ethylene-propylene-diene polymer and/or a styrene-ethylene-butadiene-styrene polymer.

12. The housing of claim 11, wherein the impact modifier has one or more carboxyl moieties attached thereto.

13. The housing of claim 9, wherein the polyamide composition further comprises one or more additional reinforcing agents selected from the group consisting of fibrous reinforcing agents having a circular cross-section; flakey reinforcing agents; and particulate reinforcing agents.

14. The housing of claim 13, wherein the additional reinforcing agents are selected from one or more of the group consisting of glass fibers, glass flakes, wollastonite, calcined clay, and kaolin.

15. The housing of claim 1 in the form of a mobile telephone housing.

16. The housing of claim 1 in the form of a laptop computer or tablet computer housing.

17. The housing of claim 1 in the form of a personal digital assistant housing.

18. he housing of claim 1, in the form a radio, camera, watch calculator, music player, global positioning system receiver, portable game, or hard drive housing.

* * * * *